(12) United States Patent
Gan (10) Patent No.: US 8,871,379 B2
(45) Date of Patent: Oct. 28, 2014

(54) SCREEN-LESS ANODE DESIGN CONCEPTS FOR LOW COST LITHIUM ELECTROCHEMICAL CELLS FOR USE IN IMPLANTABLE MEDICAL DEVICE APPLICATIONS

(75) Inventor: Hong Gan, Williamsville, NY (US)

(73) Assignee: Greatbatch Ltd., Clarence, NY (US)

( * ) Notice: Subject to any disclaimer, the term of this patent is extended or adjusted under 35 U.S.C. 154(b) by 857 days.

(21) Appl. No.: 12/914,254

(22) Filed: Oct. 28, 2010

(65) Prior Publication Data

US 2011/0104542 A1 May 5, 2011

Related U.S. Application Data

(60) Provisional application No. 61/256,518, filed on Oct. 30, 2009.

(51) Int. Cl.
| | |
|---|---|
| H01M 2/06 | (2006.01) |
| H01M 10/058 | (2010.01) |
| H01M 4/06 | (2006.01) |
| H01M 4/75 | (2006.01) |
| H01M 6/16 | (2006.01) |
| H01M 4/13 | (2010.01) |
| H01M 4/40 | (2006.01) |

(52) U.S. Cl.
CPC ............... *H01M 4/13* (2013.01); *Y02E 60/122* (2013.01); *H01M 4/06* (2013.01); *H01M 4/75* (2013.01); *H01M 6/16* (2013.01); *H01M 4/40* (2013.01)
USPC ............................ 429/178; 429/169; 29/623.1

(58) Field of Classification Search
USPC ............................................. 429/7, 121–347
See application file for complete search history.

(56) References Cited

U.S. PATENT DOCUMENTS

| | | | |
|---|---|---|---|
| 4,306,004 A | * | 12/1981 | Kaun et al. .................. 429/112 |
| 4,310,609 A | | 1/1982 | Liang et al. |
| 4,830,940 A | | 5/1989 | Keister et al. |
| 5,344,431 A | | 9/1994 | Merritt et al. |
| 5,354,629 A | | 10/1994 | Kuroda et al. |
| 5,516,340 A | | 5/1996 | Takeuchi |
| 5,856,046 A | | 1/1999 | Heilmann et al. |
| 6,443,999 B1 | | 9/2002 | Cantave et al. |
| 6,551,747 B1 | | 4/2003 | Gan |
| 6,645,670 B2 | | 11/2003 | Gan |
| 6,692,871 B2 | | 2/2004 | Gan et al. |

(Continued)

FOREIGN PATENT DOCUMENTS

EP 1089370 4/2001

OTHER PUBLICATIONS

European Search Report dated Feb. 17, 2011.

*Primary Examiner* — Kenneth Douyette
*Assistant Examiner* — James Lee
(74) *Attorney, Agent, or Firm* — Michael F. Scalise (57) ABSTRACT

A new cathode design having a first cathode active material of a relatively low energy density but of a relatively high rate capability contacted to one side of a current collector and a second cathode active material having a relatively high energy density but of a relatively low rate capability contacted to the opposite side thereof is described. A preferred cathode is: SVO/current collector/$CF_x$ with the $CF_x$ facing a lithium anode body devoid of a screen-type current collector. The lithium anode is either supported directly on the inner casing sidewall or is contacted to a relatively small strip of metal devoid of perforations and serving as an anode current collector electrically connected to the negative terminal.

34 Claims, 6 Drawing Sheets

(56) References Cited

U.S. PATENT DOCUMENTS

| | | |
|---|---|---|
| 6,783,888 B2 | 8/2004 | Gan et al. |
| 6,893,772 B2 | 5/2005 | Howard |
| 2005/0196667 A1 | 9/2005 | Brand |
| 2008/0081259 A1* | 4/2008 | Freitag et al. ............ 429/219 |

* cited by examiner

SCREEN-LESS ANODE DESIGN CONCEPTS FOR LOW COST LITHIUM ELECTROCHEMICAL CELLS FOR USE IN IMPLANTABLE MEDICAL DEVICE APPLICATIONS

CROSS-REFERENCE TO RELATED APPLICATION

This application claims priority from U.S. Provisional Application Ser. No. 61/256,518, filed Oct. 30, 2009.

BACKGROUND OF THE INVENTION

1. Field of Invention

This invention relates to the conversion of chemical energy to electrical energy. In particular, the present invention relates to various new cell designs comprising a cathode having a first cathode active material of a relatively low energy density but of a relatively high rate capability contacted to one side of a current collector and with a second cathode active material having a relatively high energy density but of a relatively low rate capability in contact with the opposite side thereof. The anode comprises lithium foil as a relatively thin metal strip, such as of nickel or stainless steel, devoid of perforations and serving as both a current collector and lead. The present cell designs are useful in applications where a premium is placed on increased energy density, such as in power sources associated with implantable medical devices.

2. Prior Art

Electrochemical cells are predominantly used as the power source for implantable medical devices such as cardiac pacemakers, defibrillators, neurostimulators, drug pumps, hearing assist devices, and bone growth devices. Such implantable medical devices generally comprise a housing containing circuitry for controlling functioning of the medical device and at least one electrochemical cell for powering the control circuitry. Depending on the application, the requirements on the cell's electrochemical properties, such as power capability and energy density, are very different. However, lithium-based cell systems are preferred as the power source for implantable medical device applications. Currently used ones incorporate various cathode active materials including silver vanadium oxide (SVO), carbon monfluoride ($CF_x$), iodine, manganese dioxide ($MnO_2$), thionyl chloride, a mixture of SVO/$CF_x$, and a sandwich of SVO/current collector/$CF_x$.

Regardless the cathode active material, a novelty of the present invention lies in the incorporation of a screen-less current collector in the anode. The screen-less current collector is in the form of a distal foil tab and a proximal extending foil portion meeting each other at a junction imbedded in the anode body. This structure replaces the conventional anode current collector screen. As will be discussed in more detail in this application, it is preferred that the screen-less current collector have extending portions "angularly radiating" from the center of the anode.

Cantave et al. in U.S. Pat. No. 6,443,999 discloses a primary lithium electrochemical cell which has a nickel tab placed at a bottom corner of the anode sheet. The tab is a small rectangular piece of metal of a length that is slightly greater than its width. Importantly, the tab disclosed by Cantave lacks angularly radiating portions or elements. That means this prior art collector structure may not necessarily be as efficient as the present current collector in directing current from the peripheral edges of locations of the anode to the tab. For that reason, the prior art tab of Cantave et al. could result in unreacted lithium being left behind after the cell has reached end-of-life discharge. Unreacted lithium is wasted and detracts from the cell's volumetric efficiency.

Thus, there is a need to develop new electrochemical cell systems having good performance characteristics suitable for powering implantable medical devices with lower manufacturing costs. The present cell systems comprising a metal strip devoid of perforations, but having arm of proximal portions emanating from a distal tab/current collector portion in a radial manner toward edges of the anode are believed to achieve these objectives.

SUMMARY OF THE INVENTION

Accordingly, the present invention is directed to improvements in the performance of lithium electrochemical cells by providing new concepts in cell design. The new cell designs are preferably of: Li-[SVO/current collector/$CF_x$—Li]$_n$. Either one or two layers of separator are placed between the cathode and anode assemblies and the anode is made from lithium foil devoid of a screen-type anode current collector. The anode contains a relatively thin strip of nickel or stainless steel devoid of perforations and serving as both a lead and current collector. A relatively thin strip foil costs much less than a screen-type anode current collector.

Accordingly, these and other objects of the present invention will become increasingly more apparent to those skilled in the art by reference to the following description read in conjunction with the appended drawings.

DETAILED DESCRIPTION OF THE PREFERRED EMBODIMENTS

An electrochemical cell according to the present invention comprises an anode of lithium metal and its intermetallic compounds including, for example, Li—Si, Li—Al, Li—B, Li—Mg, and Li—Si—B alloys. The greater the amounts of the intermetallic compound such as aluminum present by weight in the alloy, however, the lower the energy density of the cell. The form of the anode may vary, but preferably it is a thin sheet or foil of lithium metal.

The electrochemical cell further comprises a cathode of electrically conductive material, which serves as the other electrode. The cathode is preferably of solid materials. The electrochemical reaction at the cathode involves conversion of ions which migrate from the anode to the cathode into atomic or molecular forms. The solid cathode may comprise a first active material of a carbonaceous chemistry and a second active material of a metal element, a metal oxide, a mixed metal oxide, a metal sulfide, and combinations thereof. The metal oxide, the mixed metal oxide, and the metal sulfide of the second active material have a relatively lower energy density but a relatively higher rate capability than the first carbonaceous active material.

More particularly, the first active material is of a relatively high energy density and a relatively low rate capability in comparison to the second cathode active material. The first active material is preferably a carbonaceous compound prepared from carbon and fluorine, which includes graphitic and nongraphitic forms of carbon, such as coke, charcoal or activated carbon. Fluorinated carbon is represented by the formula $(CF_x)_n$, wherein x varies between about 0.1 to 1.9 and preferably between about 0.5 and 1.2, and $(C_2F)_n$, wherein n refers to the number of monomer units, which can vary widely.

The cathode design further includes a second active material formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIIB, VIIB and VIII, which includes the noble metals and/or other oxide and sulfide compounds. A preferred second cathode active material is a reaction product of at least silver and vanadium.

One preferred mixed metal oxide is a transition metal oxide having the general formula $SM_xV_2O_y$ where SM is a metal selected from Groups IB to VIIB and VIII of the Periodic Table of Elements, and wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$ in any one of its many phases, i.e., β-phase silver vanadium oxide having in the general formula x=0.35 and y=5.8, γ-phase silver vanadium oxide having in the general formula x=0.80 and y=5.40, and ε-phase silver vanadium oxide having in the general formula x=1.0 and y=5.5, and combination and mixtures of phases thereof. For a more detailed description of such cathode active materials reference is made to U.S. Pat. No. 4,310,609 to Liang et al., which is assigned to the assignee of the present invention and incorporated herein by reference.

Another preferred composite transition metal oxide cathode material includes $V_2O_z$ wherein z≤5 combined with $Ag_2O$ having silver in either the silver(II), silver(I) or silver (0) oxidation state and CuO with copper in either the copper (II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about 0.01≤z≤6.5. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. No. 5,472,810 to Takeuchi et al. and U.S. Pat. No. 5,516,340 to Takeuchi et al., both of which are assigned to the assignee of the present invention and incorporated herein by reference.

In a broader sense, it is contemplated by the scope of the present invention that the first active material of the present cathode design is any material which has a relatively higher energy density but a relatively lower rate capability than the second active material. In addition to fluorinated carbon, $Ag_2O$, $Ag_2O_2$, $CuF_2$, $Ag_2CrO_4$, $MnO_2$ and even SVO itself are useful as the first active material, and in addition to silver vanadium oxide and copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, copper oxide, copper vanadium oxide, and mixtures thereof are useful as the second active material.

Before fabrication into an electrode for incorporation into an electrochemical cell, the first and second cathode active materials prepared as described above are preferably mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium, and stainless steel. The preferred cathode active mixture thus includes a powdered fluoro-polymer binder present at about 3 weight percent, a conductive diluent present at about weight percent and about 94 weight percent of either the first or the second cathode active materials.

Cathode components are prepared by rolling, spreading or pressing the first and second cathode active materials onto opposite sides of a suitable current collector selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys. The preferred current collector material is titanium, and most preferably the titanium cathode current collector has a thin layer of graphite/carbon paint applied thereto. Cathodes prepared as described above may be in the form of one or more plates operatively associated with at least one or more plates of the lithium anode material, or in the form of a strip wound with a corresponding strip of lithium in a structure similar to a "jellyroll".

In order to prevent internal short circuit conditions, the cathode is separated from the lithium anode by a suitable separator material. The separator is of electrically insulative material that is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

The electrochemical cell further includes a nonaqueous, ionically conductive electrolyte which serves as a medium for migration of ions between the anode and the cathode during electrochemical reactions of the cell. The electrochemical reactions at the electrodes involve conversion of ions in atomic or molecular forms which migrate from the anode to the cathode. Thus, suitable nonaqueous electrolytes are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable lithium salt dissolved in a mixture of aprotic organic solvents comprising a low viscosity solvent and a high permittivity solvent. Suitable lithium salts capable of serving as a vehicle for migration of lithium ions to intercalate or react with the cathode active materials include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, triglyme, tetraglyme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. The preferred electrolyte is 0.8 M to 1.5 M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

One preferred embodiment of a cell according to the present invention has a lithium anode electrochemically associated with one of the previously described cathode active materials contacted to opposite sides of a cathode current collector. Examples of this are a Li/SVO or Li/$CF_x$ couple.

Another embodiment comprises $CF_x$, which has a relatively low power or rate capability but a relatively high energy density or volumetric capability, and SVO, which has a relatively low energy density but a relatively high rate capability, individually contacted to opposite sides of a cathode current collector screen. Therefore, one exemplary cathode design has the following configuration:

Design 1: SVO/current collector/$CF_x$

Another embodiment has the high rate cathode material (SVO) directly contacting the current collector with the relatively low rate/high capacity material ($CF_x$) being in direct contact with the high rate material. This cathode design has the following configuration:

Design 2: SVO/current collector/SVO/$CF_x$

Another alternative cathode design has the following configuration:

Design 3: $CF_x$/SVO/current collector/SVO/$CF_x$

Still another cathode design has the following configuration:

Design 4: SVO/$CF_x$/current collector/$CF_x$/SVO

In the above cathode designs, the common structure is that they all utilize a single cathode current collector, which results in a lower material cost in comparison to the sandwich cathode design of: SVO/current collector/$CF_x$/current collector/SVO described in U.S. Pat. No. 6,551,747 to Gan.

Additionally, the present invention provides the following cell design:

anode/[separator(s)/cathode/separator(s)/anode]$_n$ wherein n≥1 and the cathode has one of the structures shown above.

To further lower the cost of cell manufacturing, a screenless anode design is used. For a typical lithium cell design, in order to utilize the cell volume efficiently, the relative capacity ratio of the anode vs. the cathode is designed around 1±0.3. Since lithium is consumed during cell discharge, the lithium foil shrinks and part of the lithium can loss contact with the remaining lithium contacted to the anode current collector. That is in contrast to the tab disclosed by the previously discussed patent to Cantave et al., which lacks angularly radiating portions or elements. For that reason, the prior art tab of Cantave et al. could result in unreacted lithium being left behind after the cell has reached end-of-life discharge. Unreacted lithium is wasted and detracts from the cell's volumetric efficiency.

Figure 1:
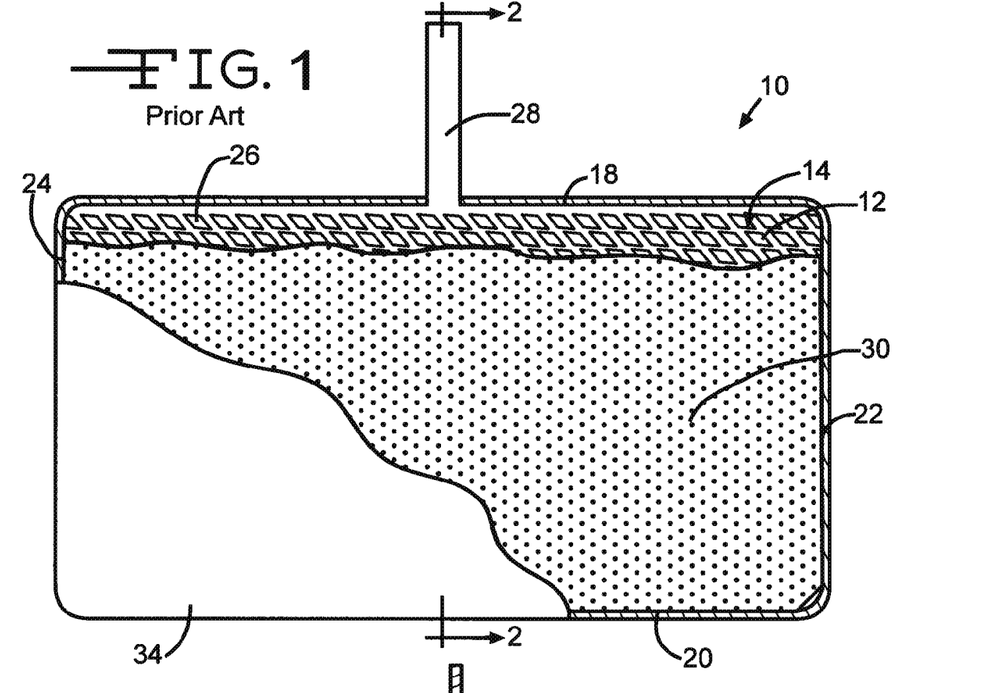
FIG. 1 is a perspective view, partly broken away, of an anode 10 according to the prior art.
Figure 2:
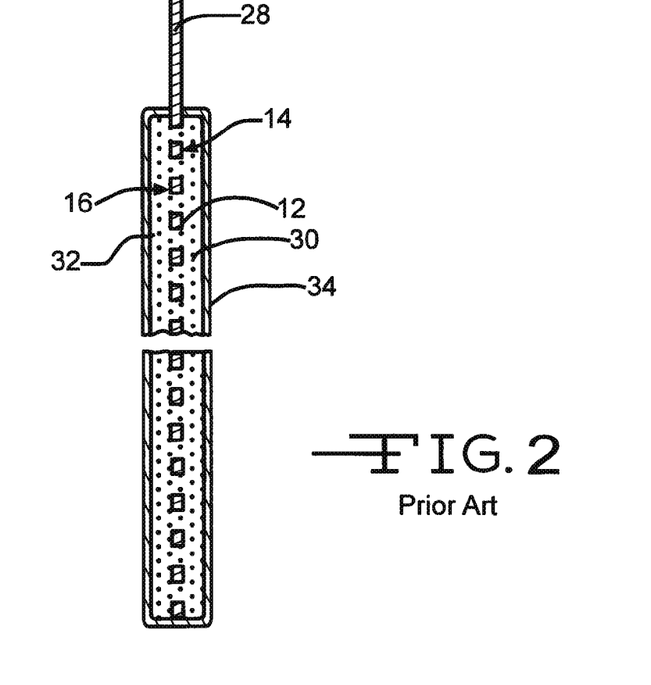
FIG. 2 is a cross-sectional view along line 2-2 of FIG. 1.

FIGS. 1 and 2 illustrate a typical prior art anode 10. The anode comprises an anode current collector 12 in the form of a screen-type structure. The current collector 12 has a front major side 14 and an opposed back major side 16, both extending to and meeting with an upper edge 18, a lower edge 20, a right edge 22 and a left edge 24. The current collector 12 is in the form of a screen with the edges 18, 20, 22 and 24 forming a peripheral border surrounding a plurality of perforations 26 extending to the opposed major sides. The perforations 26 are shown having a diamond shape, but they can have virtually any shape and be of a density ranging from about 20% to as much as 90% of the current collector area. An integral tab 28 having a width significantly less than the distance between the right and left edges 22, 24 extends upwardly from the upper edge 16.

The anode is built by press contacting two pieces 30 and 32 of lithium metal, or alloy thereof, in sheet or foil form to the opposed major sides 14, 16 of the current collector screen 12. This locks the lithium sheets 30, 32 together through the perforations 26. The lithium sheets are somewhat larger than the current collector 12 so that the peripheral border 18, 20, 22 and 24 is covered and encased in the lithium. Finally, a separator 34 envelopes the lithium supported on the anode current collector 12 except for the extending tab 28. The anode current collector 12 then serves as a path of electrical continuity between the lithium metal and the external circuit.

The cost of an anode having a prior art current collector similar to that shown in FIGS. 1 and 2 is higher than one devoid of a screen-type structure according to the present invention. Since lithium metal is a very good electrical conductor, the need for an anode current collector screen can be avoided if at the end of cell discharge life, isolation of portions of the lithium sheet, particularly at the outer reaches thereof (for example, adjacent to the border formed by edges 18, 20, 22 and 24 of the prior art anode 10), can be prevented. In that respect, the present invention has n=1 or n>1 in a cell configuration of anode/[separator(s)/cathode separator(s)/anode]$_n$ and uses a metal lead that is not a screen, i.e., is devoid of perforations, in place of the prior art anode current collector screen 12.

Figure 3A:
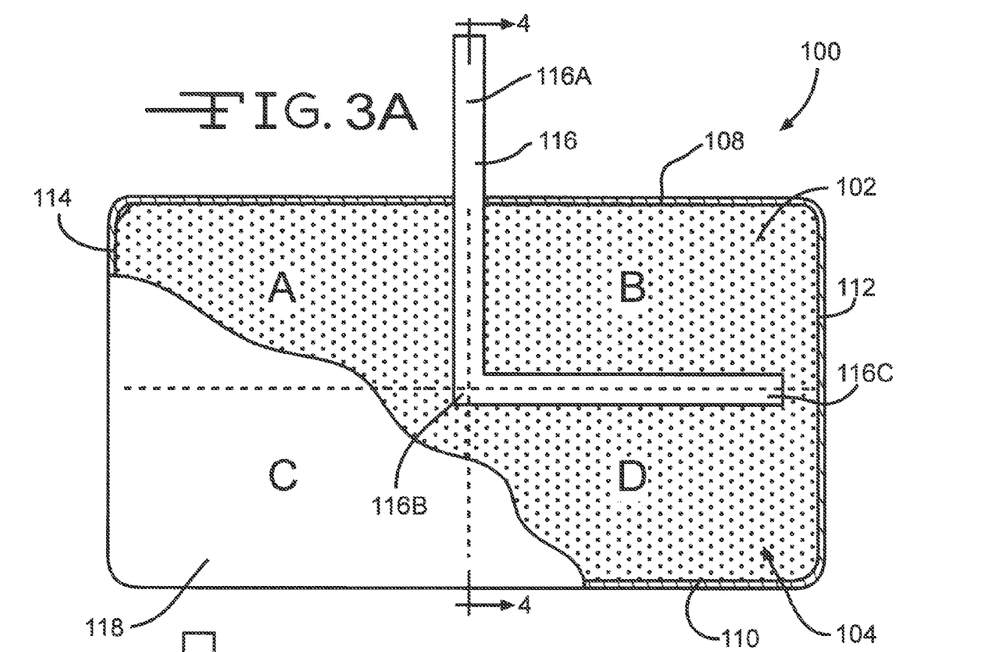
FIG. 3A is a perspective view, partly broken away, of an anode 10 according to the present invention.
Figure 3B:
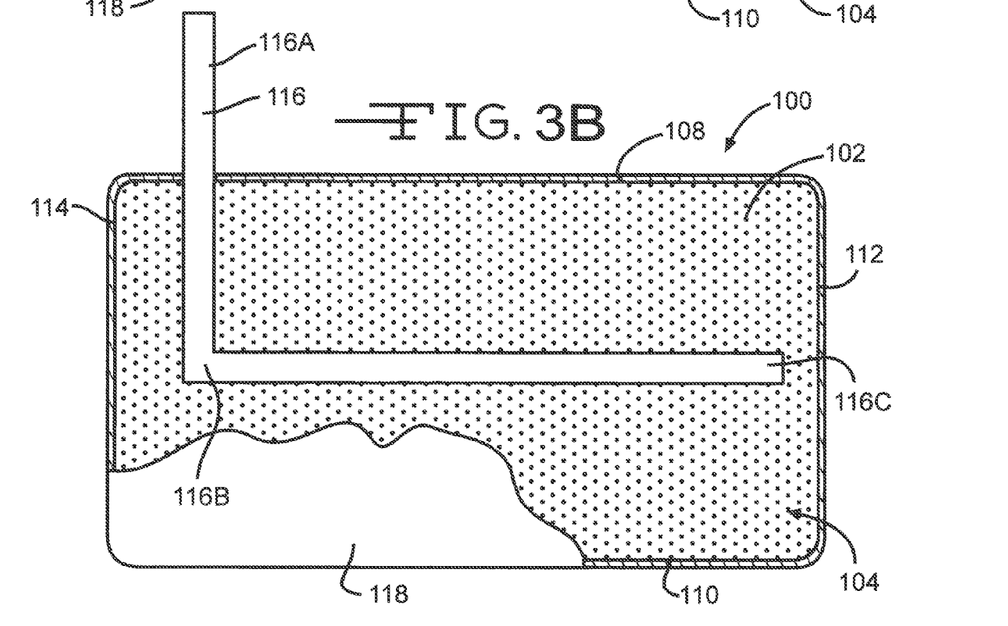
FIG. 3B is an alternate embodiment of an anode 100 according to the present invention.
Figure 4:
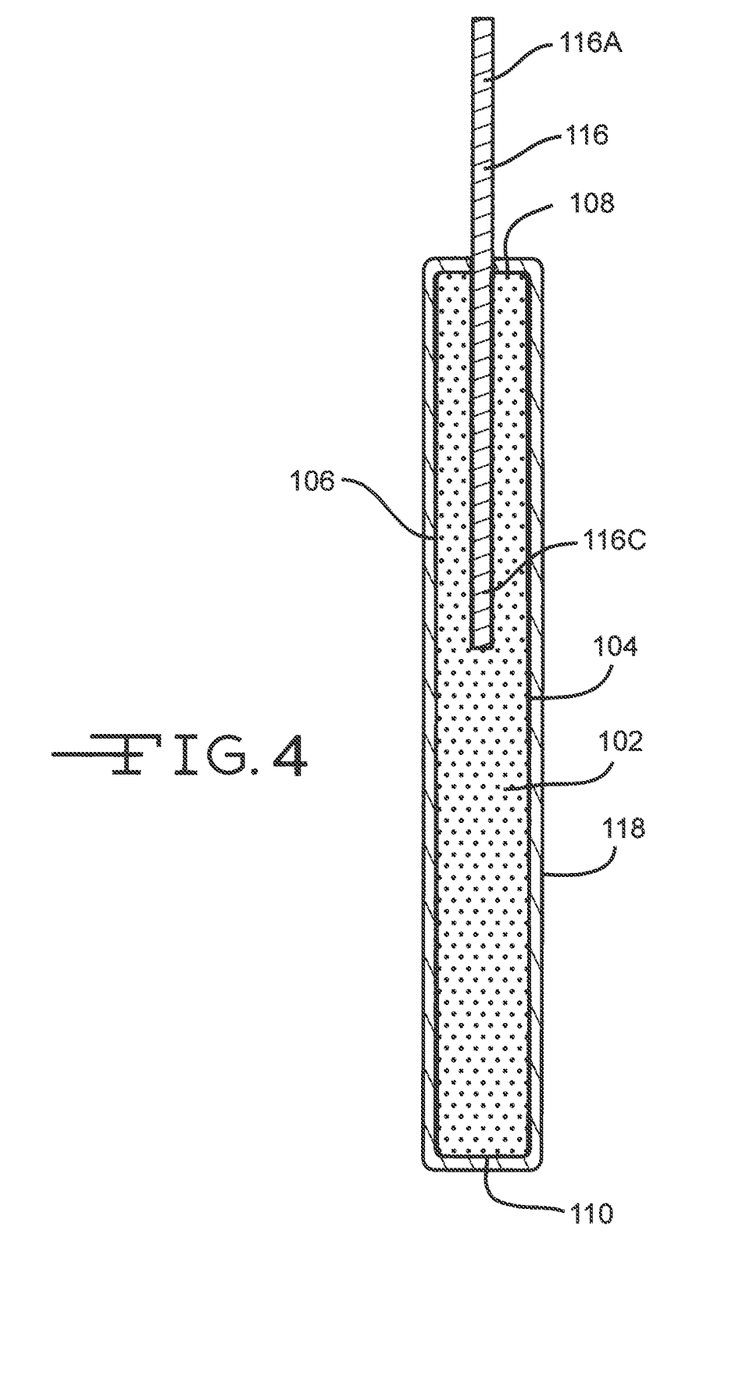
FIG. 4 is a cross-sectional view along line 4-4 of FIG. 3.

FIGS. 3A, 3B and 4 illustrate an anode 100 devoid of a screen-type current collector. The anode 100 comprises two sheets of foils of lithium metal, or alloy thereof, pressed to each other with an anode current collector 116 according to the present invention captured there between. This construction provides the anode body 102 having a front major side 104 and an opposed back major side 106, both extending to and meeting with an upper edge 108, a lower edge 110, a right edge 112 and a left edge 114. The lithium edges 108, 110, 112 and 114 form a peripheral border. The anode current collector 116 is in the form of a metal strip having a relatively narrow, but substantially constant width significantly less than the distance between the right and left anode edges 112, 114 extending upwardly from the upper edge 108 of the lithium body 102.

The current collector 116 is devoid of perforations and comprised of a metal lead substantially centered between the lithium sheets of the body 102 and which comprises a distal portion 116A extending upwardly through the lithium body from a junction 116B meeting a proximal portion 116C. In a preferred embodiment, the current collector 116 is "L-shaped" where there is a 90° angle between the distal portion 116A and the proximal portion 116C at the current collector junction 116B. The current collector 116 serves as a path of electrical continuity between the lithium body 102 and an external circuit when the distal end 116A is connected to a casing (not shown) serving as the negative terminal of a cell.

While the preferred embodiment of the current collector 116 is "L-shaped" where there is a 90.degree. angle between the distal portion 116A and the proximal portion 116C at the current collector junction 116B, the angle between the portions 116A, 116C can range from about 20.degree. to about 160.degree. with the distal portion 116A extending towards the right edge 112. The distal portion 116A can also extend from about 200° to about 340° toward the left edge 114. It should be noted that the angle between the distal and proximal portions 116A, 116C is measured from a reference position in which the long axis of the distal portion 116A is perpendicular to the top edge 108 and the longitudinal axis of the proximal portion 116C extends towards the lower or right edge 110, 112. For example, an angle of 20° would approximate the respective distal and proximal portions 116A and 116C in a one o'clock position with the proximal portion 116C extending toward the right edge 112. An angle of 340° would approximate the respective distal and proximal portions 116A, 116C in a position similar to an eleven o'clock position with the proximal portion 116C extending toward the left edge 114.

Figure 5:
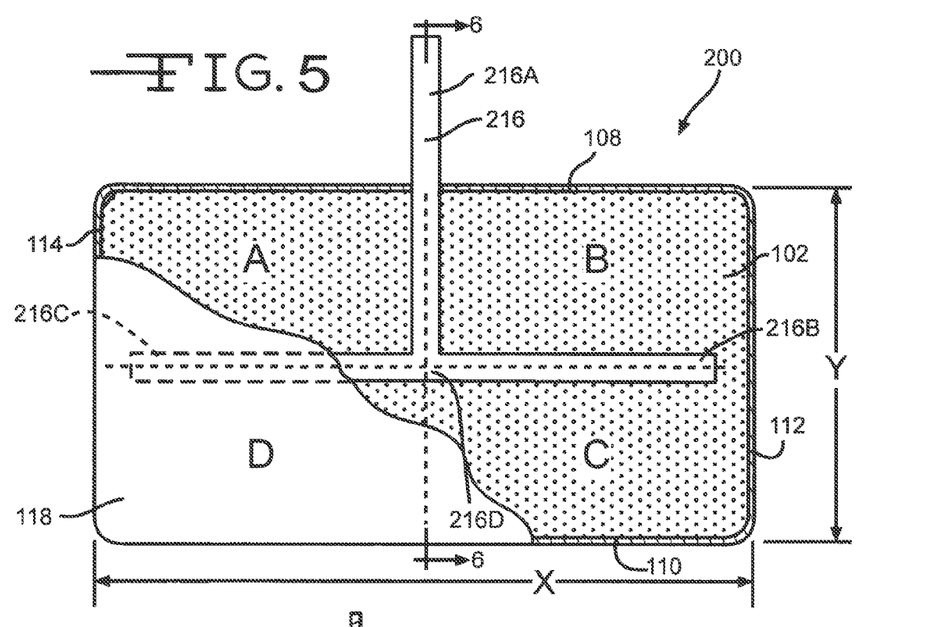
FIG. 5 is an alternate embodiment of an anode 200 according to the present invention.
Figure 7:
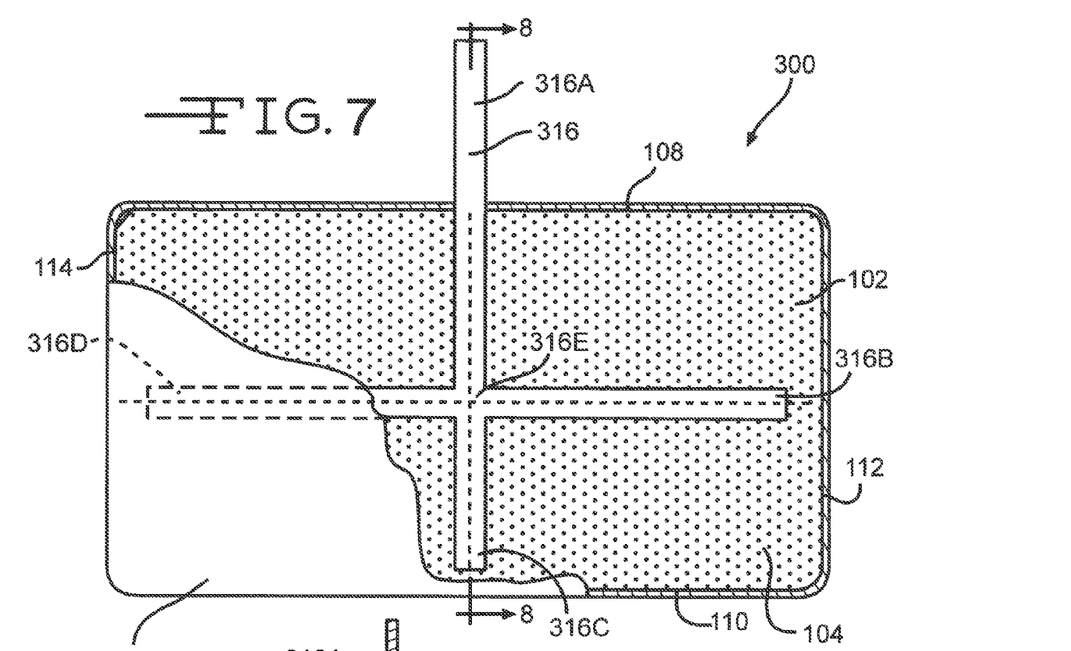
FIG. 7 is an alternate embodiment of an anode 300 according to the present invention.

As shown in FIG. 4, the current collector 116 is preferably centered between the front and back sides 104 and 106 of the lithium body 102. The proximal portion 116C preferably lies parallel to the plane that bisects the top and bottom edges 108, 110. The distal portion 116A preferably lies parallel to the plane that bisects left and right edges 112, 114. The perpendicular bisecting axes are illustrated in FIGS. 3A, 5, and 7 as dashed lines that lie along the center axis between the right and left edges 112, 114 as well as between the top and bottom edges 108, 110.

The junction 116B is preferably centered between the top and bottom edges 108, 110 and between the right and left edges 112, 114. This is illustrated in FIG. 3A with the anode being divided into four generally equal areas indicated as A, B, C and D. Each of these areas is defined as having a width being equally distant from the right and left edges 112, 114 and having a length being equally distant from the top and bottom edges 108, 110.

Area A is defined as the space that lies to the left of the axis that bisects the top edge 108 and the bottom edge 110 of the anode body 102 and above the axis that bisects the left edge 114 and right edge 112 thereof. Area B is defined as the area that lies to the right of the axis that bisects the top edge 108 and the bottom edge 110 of the anode body 102 and above the axis that bisects the left edge 114 and right edge 112 thereof. Area C is defined as the area that lies to the left of the axis that bisects the top edge 108 and the bottom edge 110 of the anode body 102 and below the axis that bisects the left edge 114 and right edge 112 thereof. Area D is defined as the area that lies to the right of the axis that bisects the top edge 108 and the bottom edge 110 of the anode body 102 and below the axis that bisects the left edge 114 and right edge 112 thereof.

In some embodiments the junction 116 $6$ could be closer to one edge than the opposing one. For example, the junction 116B could be closer to the top edge 108 than the lower edge 110 or the right edge 112 than the left edge 114. What is important is that the current collector comprises at least two portions 116A, 116C that meet each other at a junction 116B in an angular or "radial" relationship with respect to each other. FIG. 3B shows the current collector junction 116 $6$ being closer to the left edge 114 than the right edge 112 with the proximal portion 116C extending toward the right edge 112.

Except for the upstanding portion of the distal portion 116A of the current collector 116, separator 118 envelopes the lithium foil 102. Suitable materials for the current collector 116 include nickel and stainless steel, as well as titanium, copper, tungsten, tantalum, and alloys thereof. The current collector 116 is in a preferred foil form with a thin planar surface and rectangular cross section perpendicular to the length of both the distal and proximal portions 116A, 116C. The current collector 116 may also be a wire with a width and a round cross section. However, the preferred embodiment. of the current collector 116 is of a planar foil shape.

Preferably, the distal current collector portion 116A is of a width that is from about 1% to about 20% the width of the anode body 102 measured from the right edge 112 to the left edge 114 thereof. Also, the distal portion 116A extends into the lithium body 102 from about 10% to about 90% of the distance measured from the upper edge 108 to the lower edge 110 thereof. The proximal portion 116C is of a width that is about 1% to about 20% the height of the anode body 102 measured from the upper edge 108 to the lower edge 110. Likewise, the proximal portion 116C in the lithium body 102 extends from about 10% to about 90% of the distance measured from the right edge 112 to the left edge 114 thereof. A preferred thickness for the current collector is from about 0.0005" to about 0.0100".

Figure 6:
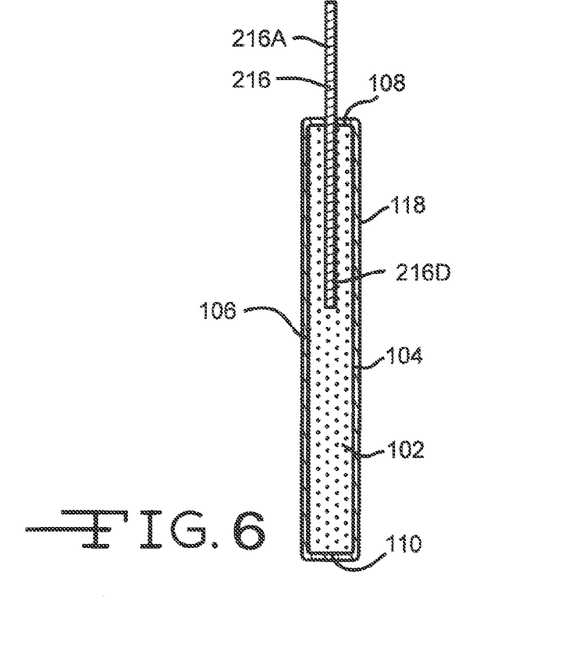
FIG. 6 is a cross-sectional view along line 6-6 of FIG. 5.

FIGS. 5 and 6 illustrate an alternate embodiment of an anode 200 according to the invention. The anode includes a current collector 216 devoid of perforations and of similar materials as current collector 116. Current collector 216 comprises a distal portion 216A meeting opposed right and left proximal portions 216B and 216C at a junction 216D. Proximal portions 216B, 216C are perpendicular to the distal portion 216A. The proximal portions 216B, 216C directly oppose each other at the junction 216D forming a "T-shape". The distal portion 216A, junction 216D and proximal portions 216B, 216C each have a substantially constant width and length.

As with the current collector 116 described in FIGS. 3A, 3B and 4, the preferred width for the portions 216A to 216C is from about 1% to 20% the width of the anode body 102, designed as X, measured from the right edge 112 to the left edge 114 thereof. Also, the distal portion 216A extends into the lithium body 102 from about 10% to about 90% of the distance measured from the upper edge 108 to the lower edge 110 thereof, designed as Y. For reference, the width between right edge 112 to the left edge 114 is labeled X and the length between top edge 108 and bottom edge 110 is labeled Y in FIG. 5. Likewise, the terminal end of the right proximal portion 216B extends in the lithium body 102 a distance spaced from the right edge 112 thereof. A preferred thickness for the current collector is from about 0.0005" to about 0.0100".

As with the previous embodiment, the current collector 216 is preferably centered between the front face 106 and back face 104 of the anode 200 as illustrated in FIG. 6. In addition, the junction 216D is preferably centered in the anode 200 between opposed edges 108, 110 and 112, 114. In that respect, the junction 216D of the "T-shaped" current collector 216 may be positioned within the various areas of the anode 200, as indicated by the designated labels A, B, C and D in FIG. 5. The four areas A, B, C and D are of equal length and width and are defined in the same manner as previously described. The preferred orientation of this exemplary embodiment is to have the junction 216D situated about the intersection of the bisecting axes. The distal portion 216A is parallel about the axis that bisects the left edge 114 and right edge 112. The longitudinal axes of the extending arms of the current collector, i.e. the proximal portions 216B, 216C are parallel to the axis that bisects the top edge 108 and bottom edge 110.

Figure 8:
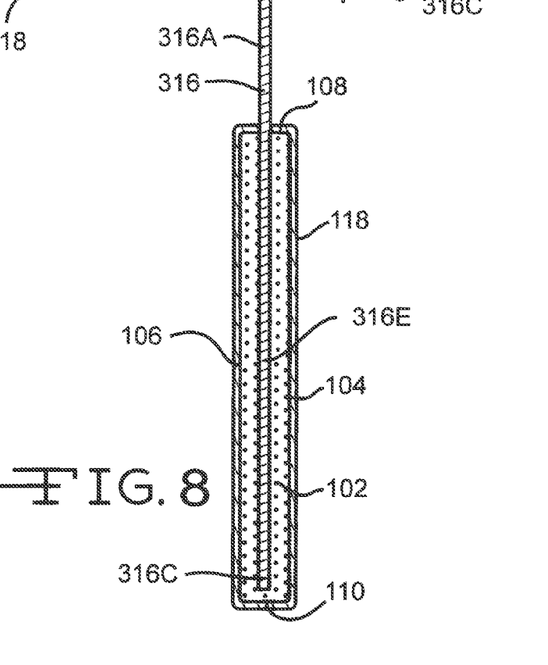
FIG. 8 is a cross-sectional view along line 7-7 of FIG. 7.

FIGS. 7 and 8 illustrate an additional embodiment of the present invention. In this embodiment the current collector is in the shape of a "cross". As illustrated, anode 300 includes a current collector 316 devoid of perforations and of similar materials as current collector 116. Current collector 316 comprises a distal portion 316A meeting respective right, middle and left proximal portions 316B, 316C and 316D at a junction 316E. Each of the portions 316A, 316B, 316C and 316D is perpendicular to one another about the junction 316E.

It can also be appreciated by one skilled in the art that additional distal portions can be added. The current collector can be constructed such that there are four, five, six or more proximal portions of similar or differing lengths and widths protruding from a junction that may or may not be equally distant from each other. In this alternate embodiment, the current collector would resemble a star shape rather than a cross.

In a preferred embodiment, the current collector junction 316E is positioned about the intersection of the axis that bisects the top edge 108 and bottom edge 110 of the anode body 102 as well as the axis that bisects the left edge 114 and right edge 112 thereof. The longitudinal axes of the proximal portions 316B, 316D are parallel about the axis that bisects the top edge 108 and bottom edge 110 of the anode body 102. That way, the three proximal portions 316B, 316C and 316D extend from the junction of the current collector at 90° angles from each other. These extending proximal portions are positioned preferably parallel about the bisecting axes of the anode 300 in such a manner that the junction 316E is positioned about the center of the anode body 102.

Figure 9:
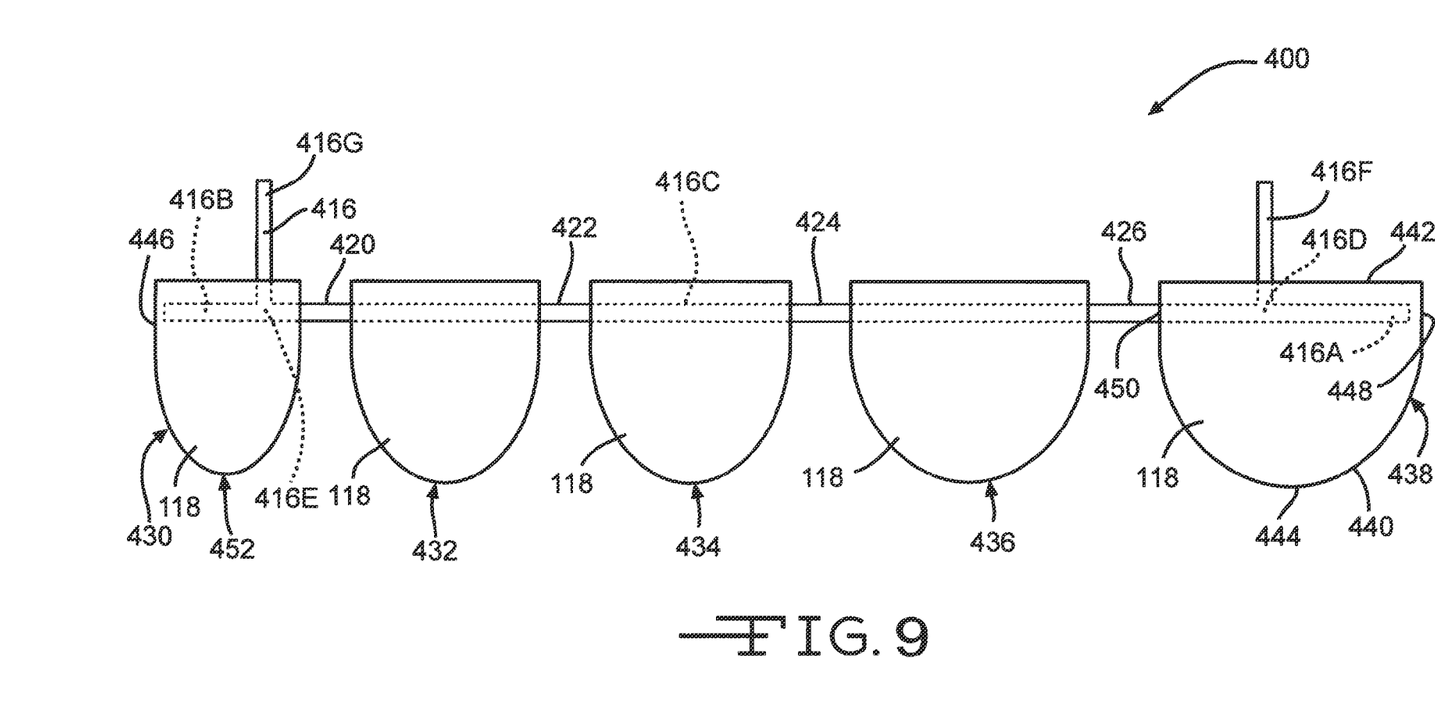
FIG. 9 is a perspective view partially in phantom, of an anode assembly 400 according to the present invention.

FIG. 9 illustrates a further embodiment of the present invention. In the embodiments shown, the anode 400 is of a "scalloped" shape. The exemplary anode 400 is comprised of a first anode plate 430, a second anode plate 432, a third anode plate 434, a fourth anode plate 436 and a fifth anode plate 438. Each of the anode plates 430, 432, 434 and 436 has a curved edge meeting a generally planar upper edge. For example, plate 438 has a curved ellipsoidal edge 440 meeting an upper edge 442. A trough point 444 of the curved edge 440 is spaced from a junction half way along the length of the upper edge 442 to provide the anode plate 438 with a height.

It should be noted that the exemplary anode 400 shown in FIG. 9 is provided with five anode plates. Depending on the specific use of the cell, the designer may choose to have more or less anode plates. In addition, the anode plates 430, 432, 434, 436 and 438 are shown getting progressively larger in size. This type of design is known in the art as a prismatic plate design. The anode plates are folded together with an overlaying cathode such that the second largest plate is adjacent to its next largest counterpart. This design affords the electrochemical cell designer added space efficiency. The anode plates may also be about the same size.

The current collector 416 is devoid of perforations and of materials similar to those of current collectors 116, 216 and 316. Current collector 416 comprises a metal lead which comprises a right and left proximal portions 416A and 416B meeting an intermediate portion 416C at respective junctions 416D and 416E. Distal portions 416E and 416F extend upwardly through the lithium foil from the junctions 416D and 416E, respectively. In a preferred embodiment, there is a 90° angle between the longitudinal axes of the proximal portions 416A, 4168 and the respective distal portions 416F and 416G.

The intermediate portion 416C is a continuous metal lead that connects the first anode plate 430 to the second anode plate 432 to the third anode plate 436 to the fourth anode plate 436 and finally to the fifth anode plate 438. A first bare section 420 is shown between the first anode plate 430 and second anode plate 432. A second bare section 422 connects the second anode plate 432 to the third anode plate 434. A third bare section 424 connects the third anode plate to the fourth anode plate. Finally, a fourth bare section 426 connects the fourth anode plate 436 to the fifth anode plate 438. Each of the four bare sections of the anode plate 420, 422, 424 and 426 are void of lithium metal.

A relatively high anode to cathode capacity ratio (A/C ratio) makes the screen-less anodes 100, 200, 300 and 400 possible. Preferably, the anode active material to the cathode active material based on a gram amount of the active materials has an A/C ratio greater than about 1.2 to up to about 5. Due to the use of extra lithium, i.e., a relatively thicker lithium foil, the lithium is not totally consumed within the useful cell discharge life. Instead, the excess lithium serves as a secondary anode current collector throughout cell discharge life in addition to the metal current collectors 116, 216, 316 and 416 of the present invention. Due to the presence of the excess lithium, the cell performance variation at the end of discharge, caused by a lithium "Swiss cheese" effect is eliminated.

The assembly of the cells described herein can be in the prismatic design shown in FIG. 9 or in the form of a wound element configuration. That is, the fabricated anode, cathode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The above assembly describes a case-negative cell, which is the preferred construction of present invention cells. As is well known to those skilled in the art, however, the exemplary cells can also be constructed in case-positive configurations.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) a casing;
   b) an anode comprising:
      i) a body of lithium as an anode active material, the body comprising spaced apart front and back major lithium body faces extending to a sidewall defining an anode thickness; and
      ii) a metal strip comprising an anode current collector, wherein the metal strip comprises spaced apart front and back major strip faces extending to and meeting with a metal strip edge, and wherein the metal, strip extends from at least one proximal metal strip portion to a distal metal strip portion having a distal metal strip end;
      iii) wherein the spaced apart front and back major strip faces of the at least one proximal metal strip portion extend within respective front and back planes in the anode thickness between the front and back major lithium body faces, and
      iv) wherein lithium directly contacts the front and back major strip faces and the metal strip edge of the at least one proximal metal strip portion, and
      v) wherein the proximal metal strip portion contacted by lithium is devoid of perforations, and
      vi) wherein the distal metal strip portion is electrically connected to an anode terminal; and
   c) a cathode of at least one cathode active material contacted to at least one side of a cathode current collector;
   d) a separator disposed between the anode and the cathode to prevent direct physical contact between them; and
   e) a nonaqueous electrolyte activating the anode and the cathode housed inside the casing.

2. The electrochemical cell of claim 1 wherein the sidewall of the lithium body comprises spaced apart upper and lower lithium body edges defining an anode height, and right and left lithium body edges defining an anode width.

3. The electrochemical cell of claim 2 wherein the proximal metal strip portion extends into the lithium body from about 2% to about 100% of the anode height.

4. The electrochemical cell of claim 1 wherein a first longitudinal axis of the distal metal strip portion meets a second longitudinal axis of the at least one proximal metal strip portion at an angle ranging from 20° to 160°.

5. The electrochemical cell of claim 1 wherein the lithium body is not in contact with a casing sidewall.

6. The electrochemical cell of claim 1 wherein the metal strip comprising the anode current collector has either a uniform or non-uniform width along its length from a proximal end of the at least one proximal metal strip portion to the distal end of the distal metal strip portion.

7. The electrochemical cell of claim 1 wherein the casing is the anode terminal.

8. The electrochemical cell of claim 1 wherein the lithium is provided in an anode to cathode capacity ratio (A/C ratio) of from about 1.2 to about 5 based on a gram amount of the anode active material to the cathode active material.

9. The electrochemical cell of claim 1 wherein the cathode active material is selected from the group consisting of silver vanadium oxide (SVO), copper silver vanadium oxide (CSVO), $V_2O_5$, $MnO_2$, copper oxide, $TiS_2$, $Cu_2S$, FeS, $FeS_2$, copper vanadium oxide, $CF_x$, $Ag_2O$, $Ag_2O_2$, CuF, $LiCoO_2$, $LiNiO_2$, $LiMnO_2$, $Ag_2CrO_4$, and mixtures thereof.

10. The electrochemical cell of claim 2 wherein a width of the distal metal strip portion is from about 1% to about 20% of the anode width.

11. The electrochemical cell of claim 1 wherein the metal strip is substantially centered in the between the front and back major lithium body faces.

12. An electrochemical cell, which comprises:
    a) a casing;
    b) an anode comprising:
       i) lithium as an anode active material having spaced apart front and back major lithium body faces extending to a sidewall defining an anode thickness, wherein the sidewall comprises spaced apart upper and lower lithium body edges defining an anode height, and right and left lithium body edges defining an anode width; and
       ii) a metal strip comprising an anode current collector, wherein the metal strip comprises spaced apart front and back major strip faces extending to and meeting with right and left strip edges, and wherein the metal strip extends from at least one proximal metal strip portion to a distal metal strip portion having a distal metal strip end;
       iii) wherein the metal strip is substantially centered in the anode thickness with the spaced apart front and back major strip faces extending within respective front and back planes between the front and back major lithium body faces, and
       iv) wherein lithium directly contacts the front and back major strip faces and the right and left strip edges at the proximal metal strip portion and part of the distal metal strip portion, but not the distal metal strip end, and
       v) wherein the metal strip is devoid of perforations where it is contacted by lithium, and
       vi) wherein the distal metal strip end is electrically connected to an anode terminal; and
    c) a cathode comprising a first cathode active material and a second cathode active material, wherein the first cathode active material has a relatively low energy density but a relatively high rate capability with respect to the second cathode active material and is contacted to one side of a cathode current collector and wherein the second cathode active material has a relatively high energy density but a relatively low rate capability with respect to the first cathode active material and is contacted to the other side of the cathode current collector;
    d) a separator disposed between the anode and the cathode to prevent direct physical contact between them; and
    e) a nonaqueous electrolyte activating the anode and the cathode housed inside the casing.

13. The electrochemical cell of claim 12 wherein a width of the distal metal strip portion is from about 1% to about 20% the anode width.

14. The electrochemical cell of claim 12 wherein the distal metal strip portion extends into the lithium body from about 2% to about 100% of the anode height.

15. The electrochemical cell of claim 12 wherein a first longitudinal axis of the distal metal strip portion meets a second longitudinal axis of the at least one proximal metal strip portion at an angle ranging from 20° to 160°.

16. The electrochemical cell of claim 12 wherein the cathode is provided in a configuration selected from the group consisting of
   i) SVO/current collector/$CF_x$;
   ii) SVO/current collector/SVO/$CF_x$;
   iii) $CF_x$/SVO/current collector/SVO/$CF_x$; and
   iv) SVO/$CF_x$/current collector/$CF_x$/SVO.

17. The electrochemical cell of claim 12 wherein the second cathode active material faces the anode.

18. The electrochemical cell of claim 12 wherein the lithium is provided in an anode to cathode capacity ratio (A/C ratio) from about 1.2 to about 5 based on a gram amount of the anode active material to the total gram amounts of the first and second cathode active materials.

19. The electrochemical cell of claim 12 wherein the anode and cathode are electrochemically associated with each other in a configuration of
   anode/[separator/cathode/separator/anode]$_n$, wherein n≥1.

20. The electrochemical cell of claim 12 wherein a casing sidewall serves as the anode terminal for an electrode assembly having a configuration of: casing sidewall/anode/separator/cathode/separator/anode/casing sidewall.

21. The electrochemical cell of claim 12 wherein the first cathode active material is selected from the group consisting of silver vanadium oxide (SVO), copper silver vanadium oxide (CSVO), $V_2O_5$, $MnO_2$, $LiCoO_2$, $LiNiO_2$, $LiMnO_2$, $TiS_2$, $Cu_7S$, FeS, $FeS_2$, copper oxide, copper vanadium oxide, and mixtures thereof, and the second cathode active material is selected from the group consisting of $CF_x$, $Ag_2O$, $Ag_2O_2$, CuF, $Ag_2CrO_4$, $MnO_2$, SVO, and mixtures thereof.

22. The electrochemical cell of claim 12 wherein the cathode current collector is selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys, and if titanium, it has a coating selected from the group consisting of graphite/carbon material, iridium, iridium oxide and platinum provided thereon.

23. The electrochemical cell of claim 12 wherein the electrolyte has a first solvent selected from the group consisting of tetrahydrofuran, methyl acetate, diglyme, triglyme, tetraglyme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, and mixtures thereof, a second solvent selected from the group consisting of propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof, and a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

24. An implantable medical device, which comprises: a housing; a control circuitry contained inside the housing to control functioning of the medical device; and an electrochemical cell contained inside the housing for powering the control circuitry, the improvement, in the cell comprising:
   a) a casing;
   b) an anode comprising:
      i) a body of lithium as an anode active material having spaced apart front and back major faces, the front and back major faces extending to an upper edge and a spaced apart lower edge defining an anode height, and right and left edges defining an anode width; and
      ii) a metal strip comprising an anode current collector, wherein the metal strip comprises spaced apart front and back major strip faces extending to and meeting with right and left strip edges, and wherein the metal strip extends from at least one proximal metal strip portion to a distal metal strip portion having a distal metal strip end;
      iii) wherein the metal strip is substantially centered in the anode thickness with the spaced apart front and back major strip faces extending within respective front and back planes between the front and back major lithium body sides, and
      iv) wherein lithium directly contacts the front and back major strip faces and the right and left strip edges at the proximal metal strip portion and part of the distal metal strip portion, but not the distal metal strip end, and
      v) wherein the metal strip is devoid of perforations where it is contacted by lithium, and
      vi) wherein the distal metal strip end is electrically connected to an anode terminal; and
   c) a cathode comprising a first cathode active material and a second cathode active material, wherein the first cathode active material has a relatively low energy density but a relatively high rate capability with respect to the second cathode active material and is contacted to one side of a cathode current collector and wherein the second cathode active material has a relatively high energy density but a relatively low rate capability with respect to the first cathode active material and is contacted to the opposite side of the cathode current collector, and wherein the second cathode active material faces the anode;
   d) a separator disposed between the anode and the cathode to prevent direct physical contact between them; and
   e) a nonaqueous electrolyte activating the anode and the cathode housed inside the casing.

25. The medical device of claim 24 wherein the first cathode active material is selected from the group consisting of SVO, CSVO, $V_2O_5$, $MnO_7$, $LiCoO_2$, $LiNiO_2$, $LiMnO_2$, $TiS_2$, $Cu_2S$, FeS, $FeS_2$, copper oxide, copper vanadium oxide, and mixtures thereof and the second cathode active material is selected from the group consisting of $CF_x$, $Ag_2O$, $Ag_2O_2$, CuF, $Ag_2CrO_4$, $MnO_2$, SVO, and mixtures thereof.

26. The medical device of claim 24 selected from the group consisting of a cardiac pacemaker, a defibrillator, a neurostimulator, a drug pump, a hearing assist device, and a bone growth device.

27. A method for providing an electrochemical cell, comprising the steps of
   a) providing a casing;
   b) providing an anode comprising:
      i) a body of lithium as an anode active material having spaced apart front and back major faces extending to a sidewall defining an anode thickness; and
      ii) a metal strip comprising an anode current collector, wherein the metal strip comprises spaced apart front and back major strip faces extending to and meeting a metal strip edge, and wherein the metal strip extends from at least one proximal metal strip portion to a distal metal strip portion having a distal metal strip end;
      iii) wherein the metal strip is substantially centered in the anode thickness with the spaced apart front and back major strip faces extending within respective front and back planes between the front and back major lithium body sides, and iv) wherein lithium directly contacts the front and back major strip faces and the metal strip edge at the proximal metal strip portion and part of the distal metal strip portion, but not the distal metal strip end, and v) wherein the metal strip is devoid of perforations where it is contacted by lithium, and vi) wherein the distal metal strip is electrically connected to an anode terminal, and c) providing a cathode of a cathode active material;

d) disposing a separator between the anode and the cathode to prevent direct physical contact between them housed inside the casing; and e) activating the anode and the cathode with a nonaqueous electrolyte.

28. The method of claim 27, including providing a width of the distal metal strip portion being from about 1% to about 20% an anode width measured from a right edge to a left edge of the lithium body sidewall.

29. The method of claim 27 including providing the distal, metal strip portion extending into the lithium body from about 2% to about 100% of an anode height measured from an upper edge to a lower edge of the lithium body sidewall.

30. The method of claim 27 including providing a first longitudinal axis of the distal metal strip portion meeting a second longitudinal axis of the at least one proximal metal strip portion at an angle ranging from 20° to 160°.

31. The method of claim 27 including providing the lithium in an anode to cathode capacity ratio (A/C ratio) ranging from about 1.2 to about 5 based on a gram amount of the anode active material to the total gram amounts of the first and second cathode active materials.

32. The method of claim 27 including selecting the first cathode active material from the group consisting of silver vanadium oxide (SVO), copper silver vanadium oxide (CSVO), $V_2P_5$, $MnO_2$, $LiCoO_2$, $LiNiO_2$, $LiMnO_2$, $TiS_2$, $Cu_2S$, FeS, $FeS_2$, copper oxide, copper vanadium oxide, and mixtures thereof, and the second cathode active material from the group consisting of $CF_x$, $Ag_2O$, $Ag_2O_2$, CuF, $Ag_2CrO_4$, $MnO_2$, SVO, and mixtures thereof.

33. The method of claim 27 including selecting the cathode current collector from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys, and if titanium, it has a coating selected from the group consisting of graphite/carbon material, iridium, iridium oxide and platinum provided thereon.

34. The method of claim 27 including providing the electrolyte has a first solvent selected from the group consisting of tetrahydrofuran, methyl acetate, diglyme, triglyme, tetraglyme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, and mixtures thereof, a second solvent selected from the group consisting of propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof, and a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LIC_6F_5SO_3$, $LiO_2CCF_3$, $LiSO_6F$, $LiB(C_6H_5)_4$, $LiCF_3SO_3$, and mixtures thereof.

* * * * *

UNITED STATES PATENT AND TRADEMARK OFFICE
CERTIFICATE OF CORRECTION

PATENT NO. : 8,871,379 B2  Page 1 of 1
APPLICATION NO. : 12/914254
DATED : October 28, 2014
INVENTOR(S) : Hong Gan It is certified that error appears in the above-identified patent and that said Letters Patent is hereby corrected as shown below:

In the Claims

Column 11, line 24 (Claim 1, line 11) after the word "metal" delete the ","

Column 12, line 58 (Claim 12, line 44) delete "nonagueous" and insert --nonaqueous--

Column 13, line 62 (Claim 24, line 5) after the word "improvement" delete the ","

Column 15, line 22 (Claim 29, line 1) after the word "distal" delete the ","

Column 16, line 4 (Claim 32, line 4) delete "V2P5" and insert --V205--

Signed and Sealed this
Nineteenth Day of May, 2015

Michelle K. Lee
*Director of the United States Patent and Trademark Office*